United States Patent [19]

Hosaka

[11] 4,297,382

[45] Oct. 27, 1981

[54] PROCESS FOR DRYING COMPOSITIONS CONTAINING DERIVED PROTEIN-CONTAINING COMPOSITIONS AND ADDITIVES

[75] Inventor: Dennis B. Hosaka, Hastings-on-Hudson, N.Y.

[73] Assignee: Stauffer Chemical Company, Westport, Conn.

[21] Appl. No.: 141,221

[22] Filed: Apr. 17, 1980

[51] Int. Cl.$^3$ .................................................. A23J 3/02
[52] U.S. Cl. ..................................... 426/656; 426/657; 426/583; 426/614; 426/564
[58] Field of Search ............... 426/549, 564, 583, 614, 426/656, 657, 661

[56] References Cited

U.S. PATENT DOCUMENTS

| | | | |
|---|---|---|---|
| 3,487,064 | 12/1969 | Swanson et al. | 426/583 X |
| 3,941,895 | 3/1976 | Ash et al. | 426/549 |
| 4,120,986 | 10/1978 | Lynn | 426/656 X |
| 4,159,982 | 7/1979 | Hermansson | 426/657 X |
| 4,163,069 | 7/1979 | Melachouris et al. | 426/657 X |
| 4,202,909 | 5/1980 | Pederson | 426/583 X |

*Primary Examiner*—Robert A. Yoncoskie
*Attorney, Agent, or Firm*—Paul J. Juettner

[57] ABSTRACT

The drying of solutions of derived protein-containing compositions and particularly mineral containing deproteinized whey byproducts and additives such as gelatin and sodium hexametaphosphate can be improved by mixing starch, preferably, a thin boiling modified starch, with the solution prior to drying. The dried product exhibits reduced hygroscopicity as well as improved physical and chemical properties.

15 Claims, No Drawings

PROCESS FOR DRYING COMPOSITIONS CONTAINING DERIVED PROTEIN-CONTAINING COMPOSITIONS AND ADDITIVES

BACKGROUND OF THE PRESENT INVENTION

This invention relates to a process for drying compositions containing derived protein-containing compositions and particularly byproducts obtained from concentrating whey protein by means of ultrafiltration or gel filtration and the dried product obtained thereby.

Because of the increasing requirement for protein sources throughout the world, various processes have been recently developed to extract protein from whey. Particular reference is made to the Dienst Attebery patent, Reissue Pat. No. 27,806, which discloses a method of separating protein from cheese whey by means of a molecular sieve resin, more commonly known as gel filtration. Also in active use is the technique of ultrafiltration to separate and concentrate the protein from the whey. The development of the separation techniques has also raised further processing problems. The byproducts from these processes are not easily adaptable to present known techniques of material handling.

In the processing of cheese whey by molecular sieve resin, a low molecular weight fraction (about 5-10% solids) is obtained which has a solids composition of mainly lactose and minerals with residual protein. The solids in this low molecular weight fraction can be described more particularly by the following typical chemical analysis.

| | |
|---|---|
| Lactose, % | 40-50 |
| Minerals, % | 25-35 |
| Protein (N × 6.38), % | 15-20 |
| Lactic Acid, % | 7-10 |
| Citric Acid, % | 3-6 |
| Fat, % | less than 1 |
| Moisture | less than 5 |
| pH | 6.6-7.2 |

Similarly, the use of ultrafiltration provides a permeate which is high in minerals and lactose. The solids in the permeate can be described more particularly by the following typical chemical analysis.

| | |
|---|---|
| Lactose, % | 70-80 |
| Minerals, % | 10-15 |
| Protein, (N × 6.38), % | 4-8 |
| Fat, % | less than 1 |
| Moisture | less than 5 |
| pH | 6-7 |

After removing the lactose by normal lactose crystallization procedures, the now delactosed permeate contains from about 40% to about 45% lactose, from about 25% to about 35% ash and from about 8% to about 12% protein (TKN × 6.38). However, the total Kjeldahl nitrogen (TKN) is a measure of all of the nitrogen in the system (protein as well as non-protein nitrogen), and this is an approximation of the total protein present. While the delactosed permeate is indicated to have 8-12% protein (TKN × 6.38), more than 60% of this protein is based on non-protein nitrogen, i.e., derived protein and amino acids. Derived protein is defined as a decomposition product of proteins that is intermediate in complexity of structure between proteins and amino acids (Hackhs' Chemical Dictionary, 3rd Ed.).

Two primary problems have been associated with the conventional drying of the low molecular weight fraction and the permeate. First of all, conventional drying techniques cannot be utilized as effectively due to undesirable particle adherence to the walls. Particle adherence to the drier walls tends to cause general ineffective drier operation as well as burnt and large particles in the final product.

The second problem associated with these products is the undesirably high level of hygroscopicity exhibited by these products. The products, particularly delactosed permeate, rapidly pick up moisture from the air. The hygroscopicity of the product adversely affects fluid characteristics of the product such that bagging becomes difficult to accomplish using common industrial equipment. Also, the undesirable level of hygroscopicity tends to detract from the potential use of this product in food applications. Once the package is opened, the dried particles immediately absorb moisture and cake.

It is also known to utilize the permeate and delactosed permeate in the formation of an egg albumen extender. In assignee's copending application Ser. No. 970,688, now U.S. Pat. No. 4,238,519 issued Dec. 9, 1980 the disclosure of which is incorporated herein by reference, there are disclosed egg albumen extenders comprising at least 65% by weight on a dry solids basis of a derived protein-containing composition from plant or animal sources wherein said derived protein-containing composition has a molecular weight of less than 20,000, a total Kjeldahl nitrogen content of from about 0.45% to about 2.1% of which at least 60% of the nitrogen is non-protein nitrogen, and from 0% to about 30% of a whipping aid, in combination with a member selected from the group consisting of gelatin, gelatin and a water soluble polyphosphate, a gum, and mixtures thereof. It has been found that these products are also difficult to dry when prepared from the liquid byproduct solution. Even in the presence of drying aids such as starch, these products are still difficult to dry. In drying blends of whey by-product, additives and starch, it was noticed that the use of the preferred high solids content feed to the spray dryer produced a product of high density. However, the high density product caked after packaging. It is theorized that the high density product does not cool and therefore cakes by fusing, particularly when immediately packaged. While cooling, such as on a conveyor, might assist in overcoming the fusion problem, the product is hygroscopic and can cake from moisture absorbed from the atmosphere during cooling. While cooling equipment with a controlled atmosphere may overcome the caking problems, the equipment would introduce expense and a time loss prior to packaging. Dry blending cannot be accomplished due to the difficulties in drying the byproduct solution before blending.

An improved process for drying a mineral containing aqueous protein solution is disclosed in U.S. Pat. No. 3,840,996. In this patent, the low molecular weight byproduct fraction from the gel filtration of the whey is admixed with inorganic drying agents selected from the group consisting of tricalcium phosphate, dicalcium phosphate, kaolin, diatomaceous earth, silica gel, calcium silicate hydrate, or mixtures thereof and spray dried. This product is useful in flavor-enhancing various foods.

In accordance with assignee's copending application Ser. No. 6,817, the drying of mineral containing delactosed or deproteinized whey byproduct solutions can be improved by mixing from about 5% to about 50% casein or alkali metal caseinates with the solution and codrying the solution. However, the high cost of casein and caseinates make this process economically unattractive.

Low D.E. carbohydrates are taught to be useful as carriers and drying aids for many dehydrated foods such as dry peanut butter, dried citrus powders, spray-dried oils, wine flavors, apple juice powder, vegetable powders, and sweetening agents (Low-D.E. Corn Starch Hydrolysates, D. G. Murry and L. R. Luft, Food Technology, March 1973, pp. 32-40). Tapioca dextrin is taught to be useful for a spray drying adjuvant (National Starch Product Bulletin No. 428).

It has now been found that the drying problems of compositions containing deproteinized mineral-containing whey solutions obtained as the byproducts of whey protein concentration and additives can be alleviated.

BRIEF SUMMARY OF THE INVENTION

In accordance with the present invention, there is provided a process for drying solutions comprising at least 65% of a derived protein-containing composition from plant or animal sources wherein the molecular weight of said derived protein-containing composition is less than 30,000, said composition having a total Kjeldahl nitrogen content of from about 0.45% to about 2.1% of which at least 60% of the nitrogen is non-protein nitrogen, and a member selected from the group consisting of from about 1% to about 15% gelatin; from about 1% to about 15% gelatin and from about 5% to about 25% of a water soluble polyphosphate, the additive total of gelatin and phosphate not to exceed about 35%; from about 0.5% to about 5% of a gum; and mixtures thereof; and from about 0% to about 30% of a whipping aid, all percentages being by weight based on the total dry solids weight of the aforerecited ingredients which comprises blending said solution of said derived protein-containing composition with said member and starch which is water swellable or soluble under the conditions of drying when used at a level sufficient to allow effective drying of said protein-containing composition and said member, adjusting the total solids content of said blend to an amount within the range of from about 15% to about 35% and drying said solution. By the use of a proper feed density, the density of the final product is such that it does not cake even if the product is packaged directly from the dryer.

The dried products of the present invention can be used broadly as food additive agents, i.e., flavor enhancers. The products are particularly adapted for use as egg albumen extenders in soft meringues.

DETAILED DESCRIPTION OF THE PRESENT INVENTION

The products of the present invention are based on certain derived protein-containing compositions. The molecular weight for substantially all matter in the derived protein-containing composition is less than 30,000 and preferably less than 20,000. A material which has been ultrafiltered through a membrane having a molecular cut-off of 20,000 is considered less than 20,000.

As used herein, the term "derived protein containing composition" is intended to include all protein decomposition products including peptides and amino acids.

The nitrogen in the derived protein-containing composition is determined by the Kjeldahl method which determines nitrogen from all sources, and cannot differentiate between protein nitrogen and non-protein nitrogen. In the present invention, the total Kjeldahl nitrogen (TKN) content in the derived protein-containing composition preferably ranges from about 0.45% to about 2.1% and more preferably from about 1.1% to about 2.1% providing a total Kjeldahl protein content of from about 3% to about 13% and from about 7% to about 13% respectively. Of the total Kjeldahl nitrogen at least about 60% is non-protein nitrogen. Non-protein nitrogen is determined by adding trichloroacetic acid to a protein solution in an amount sufficient to provide about a 15% solution of trichloroacetic acid. Protein is precipitated and removed by centrifugation. The nitrogen content of the supernatant is determined by the Kjeldahl nitrogen method. The percent total non-protein nitrogen is determined by dividing the trichloroacetic acid soluble Kjeldahl nitrogen by the total Kjeldahl nitrogen content of the original solution on a dry solids basis. The non-protein nitrogen can range as high as 2.1% (all non-protein nitrogen) and preferably from about 0.66% to about 1.68%.

The percentage of Kjeldahl nitrogen and non-protein nitrogen is based on the dry weight of the derived protein-containing composition. Further discussion can be found in Ser. No. 970,688, ibid.

The derived protein-containing composition can be prepared from legumes, oil bearing seeds, milk or milk derived products. The derived protein-containing compositions are usually byproducts of a previous procedure used to extract an ingredient from the main source.

The legumes include any members of the pea family such as peas, soy beans and peanuts and preferably soy beans. The oil bearing material seeds include those materials from which oil is extracted such as cottonseed, safflowers, corn and the like.

The derived protein-containing compositions used in the present invention are prepared, for instance, by precipitating protein from an aqueous solution in a manner similar to cheese or soy protein isolate production. When preparing soy protein isolate, soy protein is extracted from defatted soy flour and is separated from the solution by acidifying to pH of approximately 4.6. The precipitated product is called soy protein isolate and the supernatant is termed soy whey. In the countries of the Far East, a similar product is prepared by precipitating a curd or tofu from soy milk leaving a similar soy whey. These soy wheys can be further processed to remove the higher molecular weight protein and provide a product usable in the present invention. Other such by-products can be prepared from other legume or oil bearing seeds.

The derived protein-containing composition is preferably obtained from a dairy source, i.e., milk and milk derived products. The derived protein-containing composition prepared from a dairy source is generally the byproduct of a physical or chemical separation or fractionation of the various components in the milk or milk derived product. Such physical or chemical processes include gel permeation filtration, ultrafiltration, dialysis, electrodialysis, as well as protein precipitation processes such as cheese production, either enzyme or acid, chemical precipitation including acid addition for casein precipitation, polyphosphate, sodium lauryl sulfate or other such chemical protein precipitations.

Preferably, the derived protein-containing composition is prepared from soy or dairy whey and more preferably dairy whey which has been processed to further reduce the protein constituent therein. For instance, whey can be filtered through an ultra-filtration membrane to provide a protein rich retentate and a deproteinized mineral-containing lactose rich permeate.

The dried products of the present invention are preferably based on certain deproteinized whey byproduct solutions. As used herein, the term "whey byproducts" is intended to encompass the low molecular weight second fraction obtained from the molecular sieve fractionation of whey as described in U.S. Reissue Pat. No. 27,806, the permeate obtained from the ultrafiltration concentration of protein from whey, and delactosed permeate.

The low molecular weight second fraction is the material obtained by passing a partially delactosed cheese whey mother liquor through a bed of molecular sieve resin in accordance with Reissue Pat. No. 27,806 and recovering, for the purposes of this invention, the low molecular weight second fraction containing mainly lactose, minerals and residual protein. The molecular weight cut-off of the gel is preferably 30,000. The partially delactosed whey mother liquor is obtained by concentrating raw cheese whey by conventional means to a solids concentration of about 60%, reducing the temperature of the concentrate to induce lactose crystallization and thereafter separating crystalline lactose from the liquid by conventional means.

If desired, the whey can be pretreated to clarify the whey using processes such as illustrated by that disclosed in U.S. Pat. No. 3,560,219. In accordance with this patent, lipid is removed as a precipitate from whey by treating the whey solution with a calcium ion at approximately a neutral pH.

Preferably, the whey stream used in the gel filtration fractionation of whey is clarified prior to delactosing. The preferred method of clarification is the process described in U.S. Pat. No. 3,560,219 for sweet whey. For acid whey, the preferred clarification method is that shown in U.S. Pat. No. 4,036,999, the disclosure of which are incorporated herein by reference.

Also effective in the present invention is the permeate obtained from the ultrafiltration of cheese whey solutions. Ultrafiltration membranes are utilized to separate the high molecular weight protein and non-protein nitrogen compounds (below about 20,000 molecular weight); and ash in the whey solution. The protein enriched solution is retained on the membrane and it is called the retentate. The water and low molecular weight fraction passes through the membrane and is called the permeate. An illustrative method for ultrafiltration is described by Horton, B.S. et al., Food Technology, Vol. 26, page 30, 1972.

In an illustrative method for ultrafiltering cheese whey, an acid or cottage cheese whey concentrate containing from about 40% to about 60% and preferably 50%-55% whey protein is prepared by neutralizing acid whey to a pH of 6.5 with caustic. After storage, the pH is then adjusted to 7.2 and any solids or precipitates are removed by centrifugal clarification. The clarified liquor is then pasteurized and fed into the ultrafiltration membrane unit. The retentate is condensed and spray dried. The liquid permeate is then used in the process of the invention.

The permeate can be dried as is or concentrated and/or delactosed by concentration and cooling to effect a precipitation of a lactose. The permeate is a deproteinized whey solution and the delactosed permeate is a delactosed deproteinized whey solution.

The raw cheese whey source used in preparing the materials used in the invention can be acid cheese whey, sweet cheese whey, or mixtures thereof. More particularly, the raw cheese whey can be cottage cheese whey, casein cheese whey, cheddar cheese whey, mozarella cheese whey, Swiss cheese whey or mixtures thereof. Preferably, raw cheese whey used in connection with the molecular sieve fractionation is a blend of cottage cheese whey and cheddar cheese whey. The preferred cheese whey for use in the ultrafiltration fractionation of whey is acid cheese whey.

The gelatin used in the present invention can be either of the alkaline or preferably the acid prepared type. Gelatins ranging in Bloom strength from about 100 to about 300 and preferably from about 200 to about 250 Bloom can be used. The gelatin can be predissolved in water to facilitate incorporation. Preferably, "cold-water dispersible" gelatin is used.

The water soluble polyphosphates usable in the present invention are medium chain length sequestering agent polyphosphates of the formula:

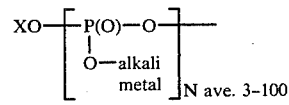

wherein X is hydrogen or alkali metal. Preferably, the average chain length (N ave.) is from 3 to 20. Representative compositions within this group are sodium or potassium tripolyphosphate, sodium or potassium tetrapolyphosphate, sodium or potassium hexametaphosphate, the more preferred being sodium hexametaphosphate (SHMP) with an average chain length 6-18, and the most preferred 9-12.

The gums which can be used in the present invention include any of the edible gums or protective colloids such as carrageenan, alginates including sodium or potassium alginate, cellulose gums including sodium or potassium alginate, cellulose gums including sodium carboxymethylcellulose, hydroxypropylcellulose, hydroxymethylpropylcellulose and preferably carboxymethylcellulose, accacia, guar, xanthan and mixtures thereof.

The gum is preferably used in an amount ranging from about 0.5% to an amount above which the final product shows adverse properties in the area of use. In general, the gum is not to exceed about 5% by weight based on the weight of the final product (exclusive of starch), the upper limit varying depending on the actual gum utilized. In some cases, more can be used and in some cases, less. The preferred gum is carrageenan which is used in amounts ranging from 0.5% up to and including about 3% (exclusive of starch).

The optional whipping aid is illustrated by enzyme hydrolyzed wheat or soy protein which can be prepared by hydrolyzing any wheat or soy protein or wheat protein mixture such as gluten by any proteolytic enzyme effective for that purpose provided the final product has a bland flavor which will not affect the overall flavor of the egg albumen replacer. Proteolytic enzymes are well known to those skilled in the art and effective proteolytic enzymes can be easily determined by such person. While the enzymatically hydrolyzed wheat or soy protein can be used alone, it is preferably used with a small quantity (up to and including about 10%) of a sugar to assist in wetting and more preferably with an additional quantity of starch (up to and including about 20%) to thicken and stabilize the mixture, and percentage being by weight based on the total weight of the enzyme hydrolyzed wheat protein. An illustration of these materials in HYFOAMA 68 available from Naarden Lenderrink and Co., Belgium and GUNTHERS 400V available from A. E. Staley.

The former material has 60% protein, 5% water, 6% ash, and 20% carbohydrate. The enzymatically hydrolyzed wheat protein is used in amounts of from about 5% to about 30% and preferably from about 10% to about 20% by weight based on the total weight of the whey byproduct containing composition exclusive of starch. The latter material is composed of enzymatically modified soy protein (55% of total), sodium hexametaphosphate, gelatin and sodium aluminum sulfate.

The starch, used in the present invention, can be any starch or blends thereof, modified or unmodified which is water-soluble (swellable) under the conditions of drying and which provides, when used at a level sufficient to allow effective drying, a whey byproduct/starch solution of a viscosity at a level sufficient to be dried in the particular drying apparatus used. The starch should not adversely affect the final use area of the product. For a solution which is to be dried in an atomizing dryer such as a spray dryer, the whey byproduct/starch solution must have a viscosity low enough to allow atomization, i.e., less than 125 cps. The starch used in forming a solution for spray drying is characterized by a thin, hot viscosity (thin-boiling) and little or no tendency to gel upon cooling. A starch which gels at the drying temperature can be effectively dried in non-atomizing dryers illustrated by drum dryers.

The starch can be derived from any starch source such as cereal grains, i.e., corn, waxy corn, wheat, sorghum, rice; tubers or roots of such plants as cassava (tapioca), potato or arrowroot and the pith from the sago palm. For the automization drying method, starches with an amylose content of below about 25% are preferred. More preferably, the molecular weight of the amylose in the starch is greater than that of the amylose of corn starch. The preferred low amylose types of starches can be illustrated by waxy corn starch. Tapioca starch is most preferred since it has both low amylose content and the high molecular weight amylose.

The starch can be modified or non-modified. Modification includes genetic modification (waxy corn or waxy sorghum), starch conversion, crosslinking, derivation, and physical treatment. Starch conversions are the most common method of modifying starch. Conversions are processes which reduce the viscosity of the raw starch when cooked by scission of the molecular at the glucosidic linkage. The conversions are generally run on starch granules for ease of recovery. Conversions on cooked starch are generally used for enzyme conversion, thermal conversion and in the production of syrups and glucose. Whole granules are used in making thin boiling or fluidity starches by acid conversion, oxidized starches, white dextrins, British gums and yellow dextrins.

Thin-boiling starches are made by controlled acid hydrolysis of starch in the granular state at about 52° C. using sulfuric or hydrochloric acid as catalyst. Cold water stability is dependent on the amount of amylose in the starch. Thin-boiling starches from corn starch can form rigid gels on cooling but stable and fluid sols from waxy corn.

Oxidized starches are prepared by treating an aqueous suspension of starch with sodium hypochlorite.

When partial or complete cold water solubility of a starch is desired, dry conversions or dextrinizations are used. Generally, a powdered starch of 5–20% moisture is prepared by treating a starch with an acid or buffer, drying, heating for pyroconversion, cooling and packing. Three stages are involved, hydrolysis, transglucosidation and repolymerization. Three basic types of products are formed using this method, i.e., white dextrins, British gums and yellow dextrins.

The maintenance of a maximum viscosity of starch without a substantial reduction in viscosity over an extended cook time is accomplished by cross-linking. Cross-linking is generally used in preparing starches for thickening and stabilizing. The starch granules are treated with di- or polyfunctional reagents capable of reacting with the hydroxyl groups in the starch molecule such as mixed anhydride of acetic and citric acid or adipic acid, meta phosphates, phosphorus oxychloride, epichlorohydrin and the like. Only a few crosslinks are necessary to toughen the starch granule.

Derivation includes reacting the hydroxyl groups of the starch with various chemical agents to change the characteristics of the starch. Physical treatment includes redrying, blending with additives such as tricalcium phosphate as a flow control agent, precooking (pregelatinized starch), drum drying ground flakes (water soluble) and spray drying cooked starches.

One major converted product area is syrups and sugars. Two types of reactions are used, acid catalyzed hydrolysis or enzyme hydrolysis. The conversions can prepare products having Dextrose Equivalents or D.E. (basic measure of conversion) ranging from very low to 75% and higher. Pure dextrose has a D.E. of 100. For purposes of the present invention, products with a D.E. of about 30 and preferably about 15 or less are useful.

The type of starch utilized depends on the physical and chemical characteristics of the starch, the amount used, the type of dryer used and the end use of the product. The preferred starch is a low amylose modified tapioca starch which is thin boiling and has little tendency to gel on cooling.

The amount of starch used is dependent on the chemical characteristics of the starch. In general, the starch is used in an amount ranging from about 20%, preferably from about 20% to about 75% and more preferably from about 25% to about 50%, said percentages being based on the dry weight of the protein component and optional gelatin, polyphosphate, gum and whipping aid. These amounts are for the preferred low amylose type starches and may vary from starch to starch. For instance, a film forming starch can be used effectively at 50% but not at 25% whereas a tapioca dextrin can be used effectively at 25%.

In general, the blend of whey byproduct, gelatin and/or phosphate or gum can be directly blended with the starch and spray dried. The use of slightly elevated temperature assists in the solubilization of the starch, and, if used, the gelatin. The temperature used in this stage should not cause gelatinization or thickening of the starch prior to spray drying. A temperature within the range of from about 60° C. and 70° C. is suggested for tapioca dextrins and for gelatin.

The solution to be spray dried should have a viscosity which is adaptable for drying in the drying apparatus selected. For spray drying, the viscosity should be less than 125 cps at the level of solids and starch needed for effective drying. Excessive starch, or excessive solids will cause the viscosity to be too high.

It has been found that the total solids content can have an adverse effect on the preparation of a usable product. For the preparation of an effective non-caking product, the total solids content of the feed to the dryer should be within the range of from about 15% to about 35% and preferably from about 20% to about 30%. These amounts may vary depending on the material being dried and the type of dryer used. Most preferably, for drying compositions of delactosed permeate, gelatin, SHMP and starch, a total solids content of about 25%±2% is preferred. The adjustment in water content is preferably accomplished by adding the amount of water required to provide the desired final total solids content to the liquid byproduct prior to the addition of the remaining ingredients. The ingredients can be blended and the total solids adjusted after blending if desired.

The blend of the starch and the whey byproduct solution can be dried by any known means depending on the starch utilized. Preferably, an atomizing type dryer is utilized. By atomizing dryer is meant any conventional dryer which effects drying of liquid by reducing or atomizing the liquid feed stream containing dissolved or suspended solids to droplet form in the presence of a drying atmosphere. This type of dryer is illustrated by a spray dryer, fluid bed dryer or flash or vacuum dryer. More particularly, the term "spray dryer" includes vertical spray dryers, horizontal spray dryers and filter mat dryers. The atomizing dryer generally includes a main drying chamber, an atomizer, e.g., a spray nozzle, adapted to feed the material to be dried into a drying atmosphere in the dryer chamber. As used herein, drying atmosphere is also intended to cover a negative pressure atmosphere such as used in a flash or vacuum evaporator.

In a conventional spray dryer, the inlet air stream is generally heated to effect drying. The inlet temperature is usually heated within the range of from about 168° C. to about 182° C. The corresponding outlet temperature usually ranges from about 110° C. to about 116° C. The temperature in the dryer is not critical with the exception that the temperature must be high enough to effectively dry the product yet insufficient to cause burning or browning. The parameters of the dryer as well as the conditions employed such as feed rate, residence time and the like can be easily discerned by one skilled in the art.

If the starch tends to gel at higher temperatures, the drying must be accomplished under low temperature conditions to avoid gelation of the starch. Air drying, vaccum drying or freeze drying can be used. Other dryers such as drum dryers can also be used depending on the characteristics of the starch utilized.

If desired, one can also include a small proportion of a drying agent or a flow control agent selected from the group consisting of tricalcium phosphate, dicalcium phosphate, kaolin, diatomaceous earth, silica gel, calcium silicate hydrate and mixtures thereof.

The blend of the whey byproduct solution and the starch dries with greater facility and is less hygroscopic allowing it to be more easily bagged. The product is substantially non-caking which facilitates the use of the product. Flavors, colors, emulsifying agents, stabilizers and the like can also be dissolved in the solution of the whey byproduct and starch and codried. Other proteins (up to 25%) such as dairy proteins or vegetable proteins can also be added though this is not preferred. Also, functional ingredients can be added in forming a final product with specific functionality.

It has also been found that the dried whey byproduct/starch blends of the invention when incorporated in a food product can perform the function of a humectant. Thus, the product of the invention can be used in areas where humectants such as propylene glycol are presently in use. The products of the invention can be used as the sole humectant or in combination with other known humectants. Effective humectant activity can be established using a sufficient amount of the humectant to provide from about 2% to about 20% by weight derived protein in said food (dry solids basis).

The blends of the present invention can be used in food products as flavor enhancing agents, flavor agents or binding agents. More specifically, the blend derived from the present invention can be used in meat products, for example, soups, stews, gravies, breadings, batters, beef patties and imitation sausages. Also, the product can be used in chip dips, cheese spreads, process cheese foods, spray dried cheeses including imitations thereof and the like. The blends can also be used in non-food areas such as cosmetics. Since the starch is a significant part of the product, its selection is relevant to any specific use.

The present invention is further illustrated in the examples which follow.

EXAMPLE 1

37.85 liters of delactosed permeate (DLP) (31–34% TS) is blended with 15 milliliters of catalase to destroy any peroxide preservative. 54.25 liters of water is then added to the DLP and the mixture is heated to 65.6° C. A dry mixture of 9.08 kilograms starch (tapioca dextrin, D.E. less than 30, K-4484, National Starch and Chemical Corp.), 3.405 kilograms sodium hexametaphosphate (SHMP) and 0.68 kilograms gelatin is prepared by dry blending. The dry blend is added to the diluted DLP to provide a solution about 25% total solids and spray dried. The product spray dries well with almost no build-up on the drier walls. 27.9 kilograms of a dense slightly hygroscopic powder is obtained. The ratio of DLP/SHMP/Gelatin to starch is about 2.1.

EXAMPLE 2

One kilogram of SHMP is blended with 10.6 liters of DLP (31% to 34% TS) in a 19 liter container with agitation. 1.5 kilograms of starch (tapioca dextrin, D.E. lower than 30, K-4484 National Starch and Chemical Corp.) and a gelatin solution of 213 grams gelatin in 1.55 liters of water are blended with the DLP/SHMP blend. After all ingredients are dissolved, the mixture is heated to 65.6° C. to provide a solution of about 40% total solids and spray dried. The product with a ratio of DLP/SHMP/Gelatin to starch of 3:1 spray dried satisfactorily. The product is hygroscopic but less than the 4:1 DLP/Starch blend. Slight product build-up in concentric rings in the dryer and some small lumps in the product are noticed. 6.8 kilograms of product are recovered.

EXAMPLE 3

A starch (Film Set™ JJR-214-C National Starch and Chemical Corp.) is blended with DLP in a 19 liter container with agitation. A solution of gelatin dissolved in hot DLP and a solution of SHMP dissolved in hot water are blended with the DLP and starch. After heating to 65.6° C., the blend is spray dried. The following compositions are used:

| Blend | Starch (Kilograms) | DLP (Liters) | Gelatin | SHMP | TS | Ratio/DLP/ Gelatin/SHMP: Starch |
|---|---|---|---|---|---|---|
| I | 2.7 | 6.8 | 163 grams in 1.66 kg hot DLP | 776 grams in 3.53 liters hot water | 42 | 1.5:1 |
| II | 4.54 | 7.57 | 182 grams in 1.85 kg hot DLP | 863 grams in 5.2 liters hot water | 43 | 1:1 |

Blend I dries reasonably well. A slight build-up on the walls of the dryer is noticed. The product is a fine powder, somewhat hygroscopic with small, hard particles. The powder starts to cake and get hard in a plastic bag a few hours after drying.

Blend II dries very well. The product is not too hygroscopic and little build-up is noted on the walls of the dryer. Surprisingly, however, the powder caked badly in a plastic bag a few hours of the drying.

EXAMPLE 4

A soft meringue having a pH equivalent to a commercial meringue (pH 8.2) is prepared by combining 40 grams of the product of the invention and 120 grams of liquid egg albumen and then dissolving 0.3 grams of cream of tartar therein. This mixture is whipped at speed No. 3 for two minutes in a 3-quart Hobart™ mixer. While whipping is continued for another five minutes at speed No. 3, 204 grams of granulated sugar is added at a rate of about 7 grams per 5 seconds. After the specific gravity of the foam is determined, 40 grams of foam is weighed into a 200 milliliter funnel fitted with a wire screen. The drainage in milliliters of liquid is determined after standing for 24 hours at 4.4°–7.2° C. 40 grams of foam is weighed in duplicate and baked inside a 204° C. oven for 7 minutes. The specific volume of the meringue is determined after drying 24 hours at 4.4° C. The compositions of the invention which can be used in this example along with data characterizing the foam and meringue are presented in Table I below:

TABLE I

| Sample | Foam Specific Gravity | Foam Syneresis (Milliliters) | Meringue Specific Volume |
|---|---|---|---|
| 75% Egg Albumen/25% Product of Invention DLP/Gelatin/ SHMP: Starch* Ratio | | | |
| 1.5:1 | .2374 | 12.0 | 6.56 |
| 2.0:1 | .2331 | 13.0 | 6.72 |
| 2.5:1 | .2323 | 13.0 | 6.79 |
| Control - Liquid Egg Albumen | .2446 | 8.0 | 6.68 |

*Modified starch having low hot viscosity and little or no tendency to set on cooling - K-4484 Tapioca Dextrin - National Starch and Chemical Corp.

EXAMPLE 5

The functionality of various starches as a codrying medium for a blend of approximately 77% DLP/4% Gelatin/19% SHMP is evaluated in soft meringues prepared in accordance with Example 4. The following starches are compared:
1. Filmset™
2. Tapioca Dextrin (K-4484)
3. H-50A (Pudding Starch)

The following results are obtained (25% albumen replaced):

TABLE II

| | FOAM | | MERINGUE |
|---|---|---|---|
| SAMPLE* | Specific Gravity | Syneresis Milliliters | Specific Volume |
| Filmset | .2451 | 19 | 7.00 |
| Tapioca Dextrin | .2375 | 15 | 7.17 |
| H-50A | .2516 | 19 | 6.65 |
| Albumen Control | .2237 | 16 | 7.75 |

*Ratio: 1.5 blend DLP/Gelatin/SHMP to 1 part starch

From these results, tapioca dextrin performed better than Filmset, and both of these performed better than H-50A.

EXAMPLE 6

The water absorption isotherms of the products of the invention are determined. At the moisture levels for intermediate moisture pet food, e.g., 20–40% moisture, the estimated water activity is above 0.55 but below 0.75. Changes in the ratio of DLP/Gelatin/SHMP to starch or the type of starch affects the water activity only slightly.

What is claimed is:

1. A process for preparing a dried egg albumin extender from an aqueous solution of an egg albumen extender comprising at least 65% of a low molecular weight protein-containing composition derived from plant or animal sources wherein the molecular weight of said derived protein-containing composition is less than 30,000, said composition having a total Kjeldahl nitrogen content of from about 0.45% to about 2.1% of which at least 60% of the nitrogen is non-protein nitrogen and a member selected from the group consisting of from about 1% to about 15% gelatin; from about 1% to about 15% gelatin and from about 5% to about 25% of a water soluble polyphosphate, the additive total of gelatin and phosphate not to exceed about 35%, from about 0.5% to about 5% of a gum, and mixtures thereof; and from 0% to about 30% of a whipping aid, all percentages being by weight based on the total dry solids weight of the egg albumen extender exclusive of starch which comprises preparing a blend of said egg extender solution and a starch which is water soluble or swellable under conditions of drying and which is used at a level sufficient to allow effective drying of said egg extender solution, adjusting the total solids of said blend to an amount between about 15% and about 35% by weight, and drying said solution.

2. The process as recited in claim 1 wherein said member is gelatin.

3. The process as recited in claim 1 wherein said member is gelatin and a water soluble polyphosphate.

4. The process as recited in claim 3 wherein said polyphosphate is sodium hexametaphosphate.

5. The process as recited in claim 1 wherein said derived protein-containing composition is the permeate resulting from the ultrafiltration of whey.

6. The process as recited in claim 1 wherein said derived protein-containing composition is the delactosed permeate resulting from the ultrafiltration of whey.

7. The process as recited in claim 1 wherein said starch is used in an amount ranging from about 20% to about 75% by weight based on the combined dry weight of all the ingredients in the dried product.

8. The process as recited in claim 7 wherein said starch is used in an amount ranging from about 25% to about 50%.

9. The process as recited in claim 2 wherein said starch is a thin-boiling starch.

10. The process as recited in claim 9 wherein said starch is a tapioca dextrin.

11. The process as recited in claim 1 wherein said drying is performed in an atomizing-type dryer.

12. The process as recited in claim 11 wherein said dryer is a spray dryer.

13. The process as recited in claim 1 wherein said derived protein-containing composition is delactosed permeate which is blended with from about 25% to about 50% tapioca dextrin and spray dried.

14. The process as recited in claim 1 wherein the molecular weight of said derived protein-containing composition is less than 20,000.

15. The process as recited in claim 1 wherein said total solids of said solution to be dried is within the range of from about 20% to about 30% by weight.

* * * * *

UNITED STATES PATENT AND TRADEMARK OFFICE
CERTIFICATE OF CORRECTION

PATENT NO. : 4,297,382
DATED : October 27, 1981
INVENTOR(S) : Dennis B. Hosaka

It is certified that error appears in the above-identified patent and that said Letters Patent are hereby corrected as shown below:

Column 7, line 10, should read  materials is HYFOAMA

Column 12, line 50, Claim 1. should read egg albumen

Signed and Sealed this

Twenty-third Day of February 1982

[SEAL]

Attest:

Attesting Officer

GERALD J. MOSSINGHOFF

Commissioner of Patents and Trademarks